United States Patent
Chang

(10) Patent No.: US 7,929,231 B2
(45) Date of Patent: Apr. 19, 2011

(54) LENS MODULE AND CAMERA MODULE HAVING SAME

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 21 days.

(21) Appl. No.: 12/484,993

(22) Filed: Jun. 15, 2009

(65) Prior Publication Data

US 2010/0033850 A1 Feb. 11, 2010

(30) Foreign Application Priority Data

Aug. 8, 2008 (CN) .......................... 2008 1 0303633

(51) Int. Cl.
*G02B 7/02* (2006.01)
(52) U.S. Cl. ........................................ 359/829; 359/819
(58) Field of Classification Search .................. 359/819, 359/822, 823–826, 829
See application file for complete search history.

(56) References Cited

U.S. PATENT DOCUMENTS

| | | | | |
|---|---|---|---|---|
| 7,095,572 B2 * | 8/2006 | Lee et al. | ...................... | 359/808 |
| 7,417,808 B2 * | 8/2008 | Noda et al. | ..................... | 359/819 |
| 7,417,812 B2 * | 8/2008 | Chang | ........................... | 359/829 |
| 7,626,773 B2 * | 12/2009 | Noda et al. | ..................... | 359/819 |
| 7,751,131 B2 * | 7/2010 | Huang et al. | .................. | 359/819 |

* cited by examiner

*Primary Examiner* — Darryl J Collins
(74) *Attorney, Agent, or Firm* — Raymond J. Chew

(57) ABSTRACT

An exemplary lens module includes a barrel, a holder receiving the barrel therein, and lenses received in the barrel. The barrel includes a circular peripheral barrel wall. An inner diameter and an outer diameter of the barrel both gradually increase from an object side to an imaging side. The holder includes a peripheral holder wall. An inner diameter of the holder gradually increases from the object side to the imaging side. The peripheral barrel wall is engaged with the peripheral holder wall. Diameters of the lenses gradually increase from the object side to the imaging side.

18 Claims, 3 Drawing Sheets

LENS MODULE AND CAMERA MODULE HAVING SAME

BACKGROUND

1. Technical Field

The present invention relates to an optical component, and particularly to a lens module and a camera module using the lens module.

2. Description of Related Art

Currently, with the development of electronic devices having multiple functions, image pick-up apparatuses have been widely used in a variety of consumer electronic devices, such as cellular telephones, notebook computers, digital cameras, personal digital assistants (PDAs), etc. In the meantime, demand for reducing the volume of consumer electronic devices is increasing, which essentially depends on the volume of a camera module of the consumer electronic device. Accordingly, a camera module with high integration and thin thickness is desired.

With the development of camera modules, the volume and thickness of camera modules are greatly reduced. Accordingly, lens modules and image sensor modules arranged in camera modules will reduce in size. However, high integration of a camera module will restrict the size of the lens module and the image sensor module of the camera module.

Therefore, what is needed is a lens module having high integration, thin thickness and max size of lens module and image sensor module.

BRIEF DESCRIPTION OF THE DRAWINGS

Many aspects of the present camera module can be better understood with reference to the following drawings. The components in the drawings are not necessarily to scale, the emphasis instead being placed upon clearly illustrating the principles of the present camera module. Moreover, in the drawings, like reference numerals designate corresponding parts throughout the several views.

DETAILED DESCRIPTION

Reference will now be made to the drawings to describe in detail of the exemplary embodiments of the camera module.

Figure 1:
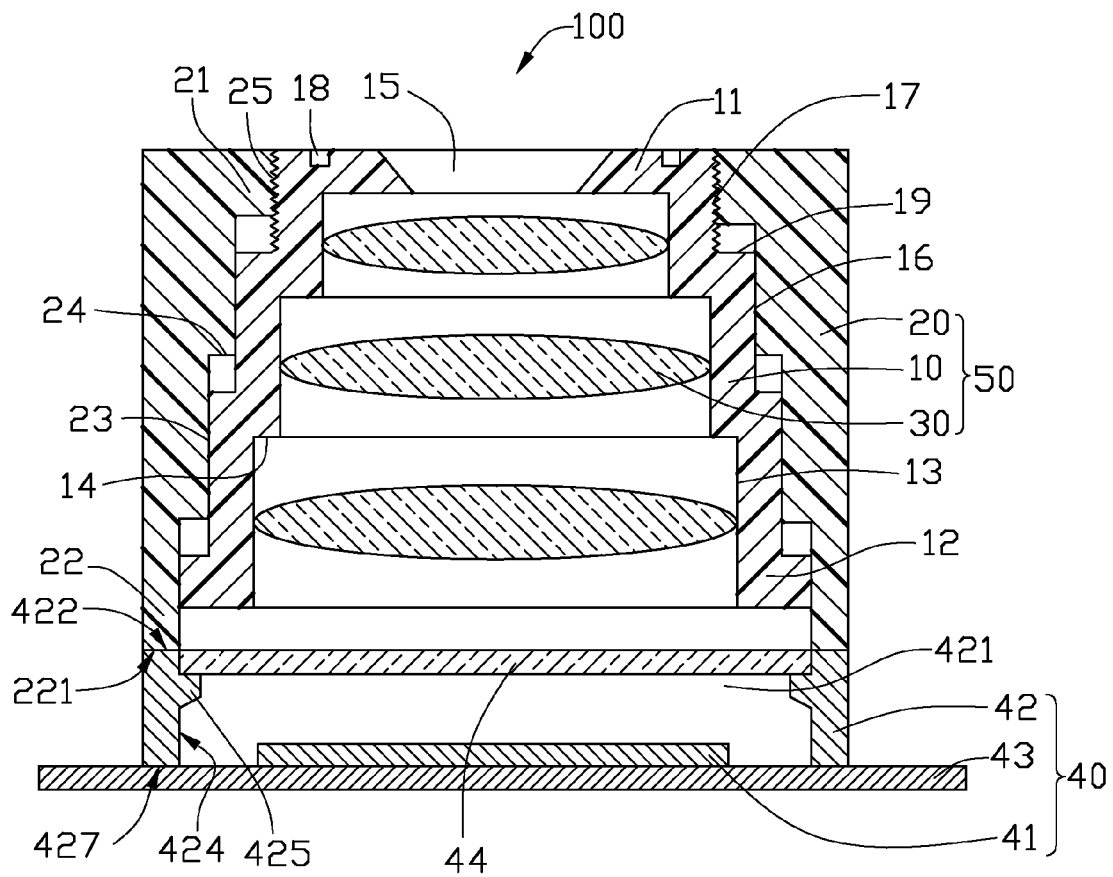
FIG. 1 is a schematic, cross-sectional view of a camera module in accordance with an exemplary embodiment.
Figure 2:
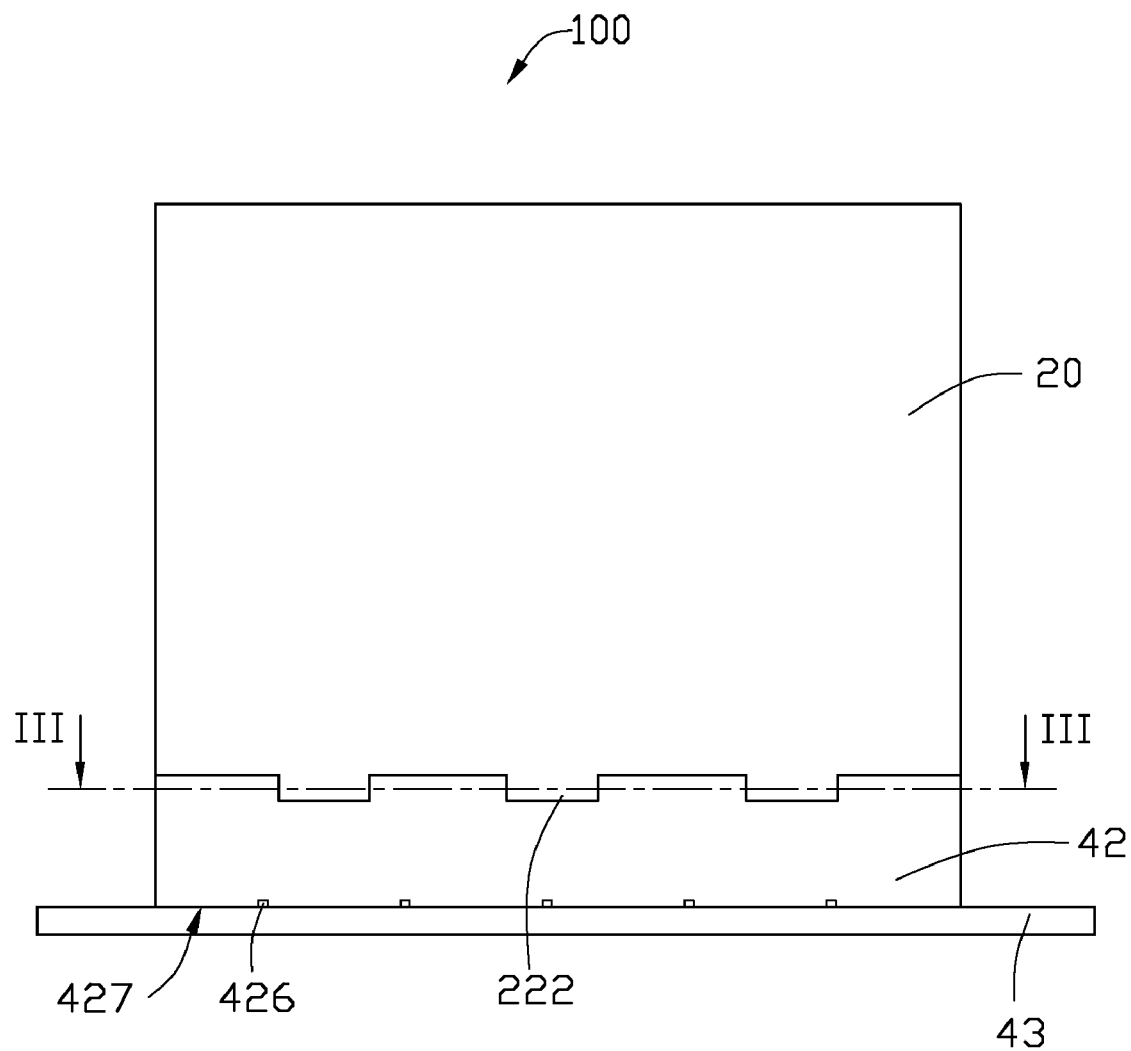
FIG. 2 is a schematic, isomeric view of the camera module of FIG. 1.
Figure 3:
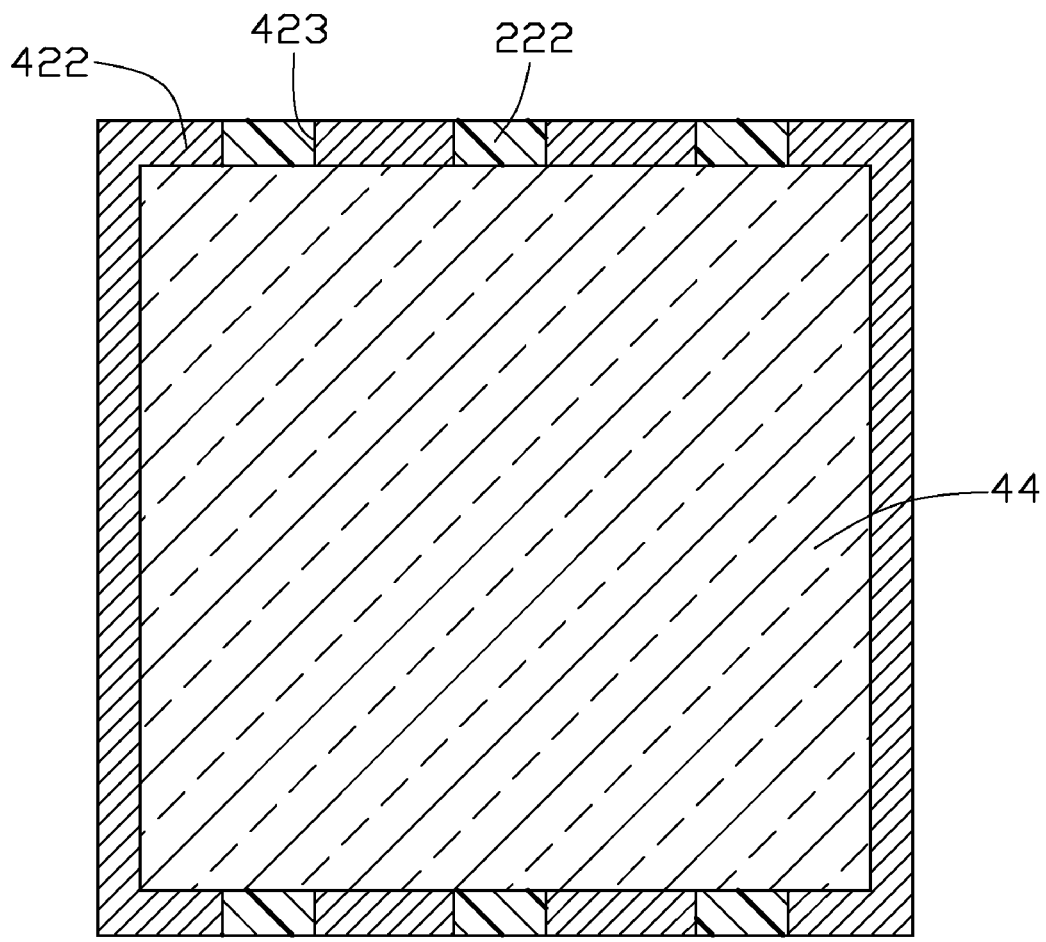
FIG. 3 is a schematic, top cross-sectional view of the camera module of FIG 1, taken along the line III-III.

Referring to FIGS. 1 to 3, a camera module 100, in accordance with an exemplary embodiment, includes a barrel 10, a holder 20, a plurality of lenses 30, and an image sensor module 40. At the same time, the barrel 10, the holder 20 and a plurality of lenses 30 corporately constitute a lens module 50.

The barrel 10 includes a first end 11 and an opposite second end 12. The first end 11 faces towards object side. The second end 12 faces towards imaging side. The barrel 10 is a hollow truncated cone. The barrel 10 includes a circular peripheral barrel wall which includes a first inner wall 13 and a first outer wall 16. An inner diameter and an outer diameter of the barrel 10 both gradually increase from object side to imaging side, that is to say, the inner diameter and the outer diameter of the barrel gradually increase from the first end 11 to the second end 12.

In the present embodiment, the first inner wall 13 is step shaped and includes a plurality of annular steps 14 formed thereon. The first outer wall 16 is also step shaped and includes a plurality of annular steps 19 formed thereon. The shape of the steps 14, 19 can be designed according to the lenses to be received. In other embodiments, the first inner wall 13 can instead be planar with no steps. The first end 11 is annular and defines an aperture 15. The first end 11 has a screw thread 17 defined on an outer wall thereof. A focusing adjustment annular groove 18 is formed in a top surface of the first end 11. A focusing function can be carried out by rotating the barrel 10 relative to the holder 20.

The holder 20 has a taper structure interior and a rectangular exterior. The taper interior is configured for receiving and coupling with the barrel 10. The holder 20 includes a first end 21 and an opposite second end 22. The first end 21 faces towards the object side. The second end 22 faces towards the imaging side. The barrel 10 includes a peripheral holder wall 23. The peripheral holder wall 23 is step shaped and includes a plurality of annular steps 24 formed thereon which are engaged with the annular steps 19 of the first outer wall 16 of the barrel 10, such that the barrel 10 can be received in the holder 20. The first outer wall 16 partially contacts the peripheral holder wall 23, with spaces in between adjacent steps of the first outer wall 16 and the peripheral holder wall 23. Accordingly, an inner diameter of the holder 20 gradually increases from the object side to the imaging side, that is to say, the inner diameter of the holder 20 gradually increases from the first end 21 to the second end 22. Accordingly, the thickness of the barrel 10 gradually reduces from the first end 21 to the second end 22. It should be understood that the cooperation structure of the barrel 10 and the holder 20 is not limited to this form. The peripheral holder wall 23 can be taper shaped with no steps, the first outer wall 16 also can be taper shaped with no steps, and two walls 23, 16 can cooperate with each other to substantially receive the barrel 10 in the holder 20.

The peripheral holder wall 23 has a screw thread 25 defined on the first end 21 thereof. The screw thread 25 is capable of engaging with the screw thread 17 of the barrel 10 to fix the barrel 10 to the holder 20. Alternatively, the barrel 10 can be assembled to the holder 20 by adhesive. By this means, the barrel 10 and the holder 20 can have no screw threads 17, 25.

The lenses 30 are received in the barrel 10. In the present embodiment, the number of lenses 30 is three. Outer diameters of the lenses 30 are different from each other and are gradually increased from the object side to the imaging side according to the inner diameter of the barrel 10. The dimensions of the lenses 30 are gradually increased along the direction from the first end 11 to the second end 12. The lenses 30 can be fixed to the barrel 10 by adhesive.

The image sensor module 40 includes an image sensor 41, a housing portion 42 and a base plate 43. The housing portion 42 defines a receiving space 421 for receiving the image sensor 41. The housing portion 42 and the image sensor 41 are mounted on the base plate 43. The image sensor module 40 is arranged on the second end 22 of the holder 20.

The housing portion 42 includes a top end adjacent to the second end 22 of the holder 20. The second end 22 includes a second end surface 221. The top end includes a top end surface 422. The top end surface 422 defines a plurality of grooves 423. The second end surface 221 includes a plurality of protrusions 222 cooperated with the grooves 423 of the top end surface 422. The protrusions 222 are inserted into the grooves 423 for fixing the holder 20 to the housing portion 42.

The second end surface 221 and the top end surface 422 are in square shape, and an area of the top end surface 221 and that of the second end surface 422 are substantially the same.

The housing portion 42 includes an inner wall 424. The inner wall 424 has a retaining portion 425. An infrared cut filter 44 is retained on the retaining portion 425.

The housing portion 42 further includes a bottom end surface 427 adjacent to the base plate 43, and the bottom end surface defines a plurality of openings 426. The aperture of each opening 426 is less than 10 μm, such that the openings 426 can prevent dust or water from entering. Because the housing portion 42 is sealed, when the image sensor 41 is at work, it will produce much heat to make interior air expand, such that the openings 426 can let the hot air go out to balance the pressure of the interior air and the exterior air of the housing portion 42.

Comparing with conventional camera modules, the camera module of the present embodiment can receive a larger image sensor and larger lenses by reducing the thickness of the holder without increasing/expanding the volume of the camera module, such that the optical capability of the lens module can be improved.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A lens module comprising:
a barrel comprising a circular peripheral barrel wall, the peripheral barrel wall comprising an inner stepped surface with a plurality of steps and an outer stepped surface with a plurality of steps, an inner diameter and an outer diameter of the barrel both gradually increasing from an object side to an imaging side;
a holder receiving the barrel therein, the holder comprising a peripheral holder wall, the peripheral holder wall comprising an inner stepped surface with a plurality of steps, an inner diameter of the holder gradually increasing from the object side to the imaging side, the steps of the outer stepped surface of the peripheral barrel wall engaged with the steps of the inner stepped surface of the peripheral holder wall; and
a plurality of lenses received in the barrel on the respective steps of the inner stepped surface of the peripheral barrel wall, diameters of the lenses gradually increasing from the object side to the imaging side.

2. The lens module of claim 1, wherein the lenses are coaxially arranged in the barrel.

3. The lens module of claim 1, wherein an adhesive is applied between the lenses and the barrel.

4. The lens module of claim 1, wherein the peripheral barrel wall further comprises an outer thread formed thereon, and the peripheral holder wall further comprises an inner thread formed thereon, the peripheral barrel wall is threadedly engaged with the peripheral holder wall.

5. The lens module of claim 4, wherein the barrel comprises an annular groove formed in a top surface at the object side, and the barrel is rotatable relative to the holder by applying a rotating adjustment in the annular groove.

6. A lens module comprising:
a barrel comprising a circular peripheral barrel wall, the peripheral barrel wall having an outer stepped surface with a plurality of steps, an inner diameter and an outer diameter of the barrel both gradually increasing from an object side to an imaging side;
a holder receiving the barrel therein, the holder comprising a peripheral holder wall, the peripheral holder wall having an inner stepped surface with a plurality of steps, the steps of the outer stepped surface of the peripheral barrel wall engaged with the steps of the inner stepped surface of the peripheral holder wall, and an inner diameter of the holder gradually increasing from the object side to the imaging side; and
a plurality of lenses received in the barrel, diameters of the lenses gradually increasing from the object side to the imaging side.

7. The lens module of claim 6, wherein the lenses are coaxially arranged in the barrel.

8. The lens module of claim 6, wherein the peripheral barrel wall further comprises an outer thread formed thereon, and the peripheral holder wall further comprises an inner thread formed thereon, the peripheral barrel wall is threadedly engaged with the peripheral holder wall.

9. The lens module of claim 8, wherein the barrel further comprises an annular groove formed in a top surface at the object side, and the barrel is rotatable relative to the holder by applying a rotating adjustment in the annular groove.

10. A camera module comprising:
a barrel comprising a circular peripheral barrel wall, the peripheral barrel wall having an outer stepped surface with a plurality of steps, an inner diameter and an outer diameter of the barrel both gradually increasing from an object side to an imaging side;
a holder receiving the barrel therein, the holder comprising a peripheral holder wall, the peripheral holder wall having an inner stepped surface with a plurality of steps, the steps of the outer stepped surface of the peripheral barrel wall engaged with the steps of the inner stepped surface of the peripheral holder wall, an inner diameter of the holder gradually increasing from the object side to the imaging side;
a plurality of lenses received in the barrel, diameters of the lenses gradually increasing from the object side to the imaging side; and
an image sensor module comprising an image sensor, a housing portion and a base plate, the housing portion defining a receiving space for receiving the image sensor, the housing portion and the image sensor being mounted on the base plate.

11. The camera module of claim 10, wherein the peripheral barrel wall further has an inner stepped surface with a plurality of steps, and the lenses are disposed on the respective steps of the inner stepped surface of the peripheral barrel wall.

12. The camera module of claim 10, wherein the lenses are coaxially arranged in the barrel.

13. The camera module of claim 10, wherein the housing portion further comprises a bottom end surface adjacent to the base plate, the bottom end surface defining a plurality of openings.

14. The camera module of claim 10, wherein the housing portion comprises an inner wall, and the inner wall comprises a retaining portion for retaining an infrared cut filter thereon.

15. The camera module of claim 10, wherein the holder comprises a first end and an opposite second end, the housing portion comprising a top end adjacent to the second end of the holder, the second end comprising a second end surface, the top end comprising a top end surface, the top end surface defining a plurality of grooves, and the second end surface comprising a plurality of protrusions engaged in the grooves of the top end surface.

16. The camera module of claim 15, wherein the second end surface and the top end surface are square in shape, and an area of the top end surface and that of the second end surface are substantially the same.

17. The camera module of claim 15, wherein the peripheral barrel wall further has an outer thread formed thereon, the peripheral holder wall further has an inner thread formed thereon, and the peripheral barrel wall is threadedly engaged with the peripheral holder wall.

18. The camera module of claim 17, wherein the barrel further comprises an annular groove formed in a top surface at the object side, and the barrel is rotatable relative to the holder by applying a rotating adjustment in the annular groove.

* * * * *